United States Patent
Tu et al.

(10) Patent No.: US 9,251,421 B2
(45) Date of Patent: Feb. 2, 2016

(54) SYSTEM AND METHOD FOR GENERATING SEMANTIC ANNOTATIONS

(71) Applicant: General Electric Company, Schenectady, NY (US)

(72) Inventors: Peter Henry Tu, Niskayuna, NY (US); Jens Rittscher, Ballston Lake, NY (US); Li Guan, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 279 days.

(21) Appl. No.: 13/918,905

(22) Filed: Jun. 15, 2013

(65) Prior Publication Data

US 2014/0072171 A1 Mar. 13, 2014

(51) Int. Cl.
G06K 9/00 (2006.01)
G06K 9/62 (2006.01)
G06F 17/30 (2006.01)

(52) U.S. Cl.
CPC ...... *G06K 9/00671* (2013.01); *G06F 17/30781* (2013.01); *G06K 9/00718* (2013.01); *G06K 9/00771* (2013.01); *G06K 9/62* (2013.01); *G06K 9/6224* (2013.01); *G06K 9/6288* (2013.01)

(58) Field of Classification Search
None
See application file for complete search history.

(56) References Cited

U.S. PATENT DOCUMENTS

| | | | |
|---|---|---|---|
| 6,970,576 B1 | 11/2005 | Tilsley | |
| 7,571,157 B2 * | 8/2009 | Chowdhury et al. | |
| 7,634,466 B2 * | 12/2009 | Rose et al. | |
| 7,680,951 B1 * | 3/2010 | Kulik | 709/238 |
| 7,737,837 B2 | 6/2010 | Donovan et al. | |
| 8,274,377 B2 | 9/2012 | Smith et al. | |
| 8,285,060 B2 | 10/2012 | Cobb et al. | |
| 8,316,032 B1 * | 11/2012 | Baluja et al. | 707/749 |
| 8,334,763 B2 | 12/2012 | Jackson | |
| 2010/0023162 A1 | 1/2010 | Gresak et al. | |
| 2012/0216243 A1 | 8/2012 | Gill et al. | |
| 2012/0256745 A1 | 10/2012 | Piett et al. | |
| 2012/0314063 A1 | 12/2012 | Cirker | |
| 2014/0072171 A1 * | 3/2014 | Tu et al. | 382/103 |

OTHER PUBLICATIONS

Abreu et al., "Video-Based Multi-Agent Traffic Surveillance System", IV Proceedings of the IEEE Intelligent Vehicles Symposium, Oct. 3-5, 2000, pp. 457-462.

Najib, Ben Aoun, et al., "Graph Aggregation Based Image Modeling and Indexing for Video Annotation," Computer Analysis of Images and Patterns, Aug. 29, 2011, pp. 324-331, Berlin.

(Continued)

*Primary Examiner* — Tahmina Ansari
(74) *Attorney, Agent, or Firm* — Joseph J. Christian

(57) ABSTRACT

In accordance with one aspect of the present technique, a method is disclosed. The method includes receiving a new video from one or more sensors and generating a new content graph (CG) based on the new video. The method also includes comparing the new CG with a plurality of prior CGs. The method further includes identifying a first portion of the new CG matching a portion of a first prior CG and a second portion of the new CG matching a portion of the second prior CG. The method further includes analyzing a first set of semantic annotations (SAs) associated with the portion of the first prior CG and a second set of SAs associated with the portion of the second prior CG. The method further includes generating a sequence of SAs for the new video based on the analysis of the first and the second set of SAs.

20 Claims, 3 Drawing Sheets

(56) References Cited

OTHER PUBLICATIONS

Nastaran, Fatemi, et al., "A Conceptual Graph Approach for Video Data Representation and Retrieval," Advances in Intelligent Data Analysis, Jan. 1, 1999, pp. 525-536, vol. 1642.

Charhad, M., et al., "Semantic Video Content Indexing and Retrieval Using Conceptual Graphs," Proceedings 2004 International Conference on Information and Communication Technologies: From Theory to Applications, Jan. 1, 2004, pp. 399-400.

Turaga, P., et al., "Machine Recognition of Human Activities: A Survey," IEEE Transactions on Circuits and Systems for Video Technology, Nov. 1, 2008, pp. 1473-1488, vol. 18, No. 11, Piscataway, NJ, USA.

PCT Search Report and Written Opinion dated Jan. 17, 2014 from corresponding Application No. PCT/US2013/059453.

* cited by examiner

SYSTEM AND METHOD FOR GENERATING SEMANTIC ANNOTATIONS

CROSS-REFERENCE TO RELATED APPLICATIONS

This application claims the benefit of U.S. Provisional Patent Application No. 61/700,542, filed on Sep. 13, 2012, entitled "Situational awareness for gas stations and similar commercial sites of interest" which is herein incorporated by reference in its entirety.

BACKGROUND

The subject matter disclosed herein generally relates to generating semantic annotations. More specifically, the subject matter relates to systems and methods for generating an event narrative, i.e., a sequence of semantic annotations for an event based on semantic annotations of previous events.

Current intelligence platforms receive vast amounts of inputs (e.g., video inputs, audio inputs, geographic signals, and the like) and determine critical events from the received inputs, using rule based systems, finite state machines, and the like. For example, a manufacturing factory includes a video surveillance system for receiving a live-video feed and detects a crime scene from the received video-feed. In such an example, the video surveillance system generates metadata from the live-video feed and analyzes whether the metadata satisfies, for example, a pre-defined rule describing a crime.

Such intelligence platforms have numerous problems. For example, such intelligence platforms fail to detect events that have not been previously encountered and pre-defined by an administrator of the intelligence platform. Thus, there is a need for an enhanced system and method for generating semantic annotations which will allow for reasoning over events that transcends the analysis of raw meta-data.

BRIEF DESCRIPTION

In accordance with one aspect of the present technique, a method is disclosed. The method includes receiving a new video from one or more sensors and generating a new content graph (CG) based on the new video. The method also includes comparing the new CG with a plurality of prior CGs, wherein the plurality of prior CGs are generated from previously received videos. The method further includes identifying a first portion of the new CG matching a portion of a first prior CG and a second portion of the new CG matching a portion of the second prior CG. The method further includes analyzing a first set of semantic annotations (SAs) associated with the portion of the first prior CG and a second set of SAs associated with the portion of the second prior CG. The method further includes generating a sequence of SAs for the new video based on the analysis of the first and the second set of SAs.

In accordance with one aspect of the present systems, a system is disclosed. The system includes a graph module for receiving a new video from one or more sensors and generating a new content graph (CG) based on the new video. The system also includes a comparison module for comparing the new CG with a plurality of prior CGs and identifying a first portion of the new CG matching a portion of a first prior CG and a second portion of the new CG matching a portion of a second prior CG, wherein the plurality of prior CGs are generated from previously received videos. The system further includes a narrative module for analyzing a first set of semantic annotations (SAs) associated with the portion of the first prior CG and a second set of SAs associated with the portion of the second prior CG and generating a sequence of SAs for the new video based on the analysis of the first and the second set of SAs.

In accordance with one aspect of the present technique, a computer program product encoding instructions is disclosed. The instructions when executed by a processor, causes the processor to receive a new video from one or more sensors and generating a new content graph (CG) based on the new video, wherein the plurality of prior CGs are generated from previously received videos. The instructions further cause the processor to compare the new CG with a plurality of prior CGs, wherein the plurality of prior CGs are generated from previously received videos. The instructions further cause the processor to identifying a first portion of the new CG matching a portion of a first prior CG and a second portion of the new CG matching a portion of the second prior CG. The instructions further cause the processor to analyze a first set of semantic annotations (SAs) associated with the portion of the first prior CG and a second set of SAs associated with the portion of the second prior CG. The instructions further cause the processor to generate a sequence of SAs for the new video based on the analysis of the first and the second set of SAs.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

In the following specification and the claims, reference will be made to a number of terms, which shall be defined to have the following meanings.

The singular forms "a", "an", and "the" include plural references unless the context clearly dictates otherwise.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As used herein, the terms "software" and "firmware" are interchangeable, and include any computer program stored in memory for execution by devices that include, without limitation, mobile devices, clusters, personal computers, workstations, clients, and servers.

As used herein, the term "computer" and related terms, e.g., "computing device", are not limited to integrated circuits referred to in the art as a computer, but broadly refers to at least one microcontroller, microcomputer, programmable logic controller (PLC), application specific integrated circuit, and other programmable circuits, and these terms are used interchangeably herein.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or inter-changed, such ranges are identified and include all the sub-ranges contained therein unless context or language indicates otherwise.

Figure 1:
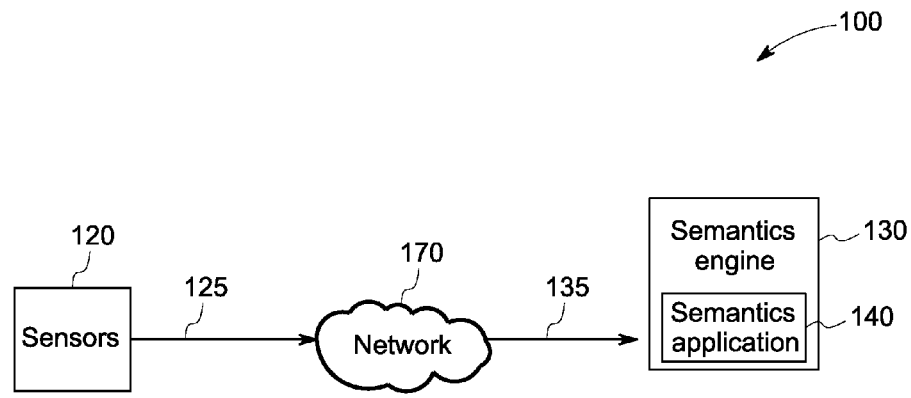
FIG. 1 is a block diagram illustrating a system for generating semantic annotations according to one embodiment.

A system and method for generating semantic annotations is described herein. FIG. 1 illustrates a block diagram of a system 100 for generating semantic annotations according to one embodiment. The illustrated system 100 includes one or more sensors 120 and a semantics engine 130 that are communicatively coupled via a network 170.

The sensors 120 are any type of devices configured to measure a physical quantity or characteristic, for example, pressure, light, sound, temperature, motion, and the like. The sensors 120 may include image sensors, acoustic sensors, proximity sensors, bio sensors, mechanical sensors, gyroscopic sensors, thermal sensors, pressure sensors, and the like and generate input data. In one embodiment, the sensors 120 are installed in a commercial site, for example, a gas station, a convenience store, a hospital, and the like. In such an embodiment, the sensors 120 are configured to generate input data associated with events occurring at the commercial site.

In one example, the sensors 120 include an image sensor (e.g., a video camera, closed-circuit television camera, and the like.) for capturing images and/or recording a video of a car entering a gas station. In a further example, the sensors 120 include a mechanical sensor for determining whether a fuel dispenser is removed and gasoline is being pumped. In another example, the sensors 120 include an audio recorder for recording a customer's speech. In another example, the sensors 120 include a point of sale of sensor for determining whether a customer paid for the gasoline. In one embodiment the sensors 120 are further configured to send the generated input data to the semantics engine 130 via the network 170. The sensors 120 are communicatively coupled to the network 170 via signal line 125. The signal line 125 is provided for illustrative purposes and represents the one or more sensors 120 communicating by wired or wireless means over the network 170. In one example the sensors 120 have transmission capability to send out the sensor and imaging data. In another example, the 120 are coupled to a communication device (not shown) that facilitates the transmission of the sensor data. Although in the illustrated embodiment, a plurality of sensors 120 are shown, in other embodiments, a single sensor 120 may be coupled to the network 170.

The semantics engine 130 is any type of device for receiving input data, i.e., the sensor data from the sensors 120 and generating semantic annotations for the received input data. The semantics engine 130 generates a sequence of semantic annotations for the received input data based on semantic associations associated with previously received input data. In the illustrated system 100, the semantics engine 130 includes a semantics application 140. The semantics engine 130 is communicatively coupled to the network 170 via signal line 135. Although, in the illustrated embodiment, one semantics engine 130 is shown, in other embodiments, a plurality of semantic engines 130 may be coupled to the network 170. The semantics application 140 and the semantic annotations are described below in more detail with reference to FIG. 2.

The network 170 may be a wired or wireless communication type, and may have any number of configurations such as a star configuration, token ring configuration, or other known configurations. Furthermore, the network 170 may include a local area network (LAN), a wide area network (WAN) (e.g., the Internet), and/or any other interconnected data path across which multiple devices may communicate. In one embodiment, the network 170 may be a peer-to-peer network. The network 170 may also be coupled to or includes portions of a telecommunication network for transmitting data in a variety of different communication protocols. In another embodiment, the network 170 includes Bluetooth communication networks or a cellular communications network for transmitting and receiving data such as via a short messaging service (SMS), a multimedia messaging service (MMS), a hypertext transfer protocol (HTTP), a direct data connection, WAP, email, and the like. While only one network 170 is coupled to the plurality of sensors 120 and the semantics engine 130, other types of networks 170 may be coupled to the entities. Multiple networks can provide redundancy and can be optimally configured according to the design criteria.

Figure 2:
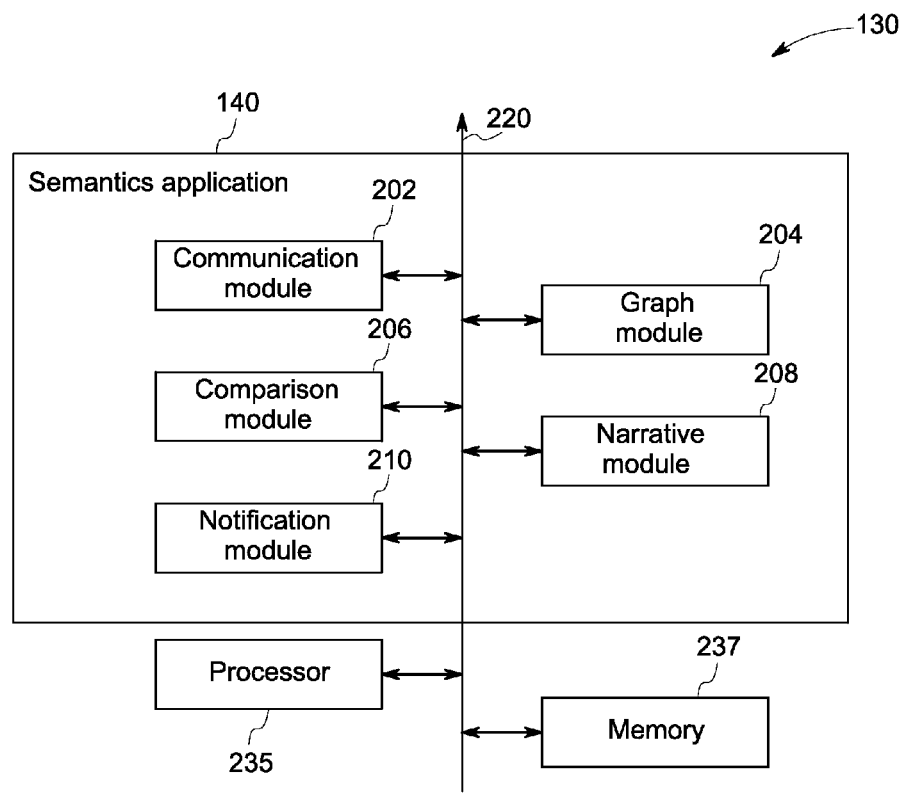
FIG. 2 is a block diagram illustrating a semantics engine according to one embodiment.

FIG. 2 is a block diagram illustrating the semantics engine 130 according to one embodiment. The semantics engine 130 includes the semantics application 140, processor 235, and memory 237. The semantics application 140 includes a communication module 202, a graph module 204, a comparison module 206, a narrative module 208, and a notification module 210. The modules of the semantics application 140, the processor 235, and the memory 237 are coupled to the bus 220 for communication with one another.

The processor 235 may include at least one arithmetic logic unit, microprocessor, general purpose controller or other processor arrays to perform computations, and/or retrieve data stored on the memory 237. In another embodiment, the processor 235 is a multiple core processor. The processor 235 processes data signals and may include various computing architectures including a complex instruction set computer (CISC) architecture, a reduced instruction set computer (RISC) architecture, or an architecture implementing a combination of instruction sets. The processing capability of the processor 235 in one example may be limited to supporting the retrieval of data and transmission of data. The processing capability of the processor 235 in another example may also perform more complex tasks, including various types of feature extraction, modulating, encoding, multiplexing, and the like. In other embodiments, other type of processors, operating systems, and physical configurations are also envisioned.

The memory 237 may be a non-transitory storage medium. For example, the memory 237 may be a dynamic random access memory (DRAM) device, a static random access memory (SRAM) device, flash memory or other memory devices. In one embodiment, the memory 237 also includes a non-volatile memory or similar permanent storage device, and media such as a hard disk drive, a floppy disk drive, a compact disc read only memory (CD-ROM) device, a digital versatile disc read only memory (DVD-ROM) device, a digital versatile disc random access memories (DVD-RAM) device, a digital versatile disc rewritable (DVD-RW) device, a flash memory device, or other non-volatile storage devices.

The memory 237 stores data that is required for the semantics application 140 to perform associated functions. In one embodiment, the memory 237 stores the modules (for example, the communication module 202, the narrative module 208, and the like) of the semantics application 140. In another embodiment, the memory 237 stores notification categories that are defined, for example, by an administrator of the semantics engine 130. The notification categories are described below in further detail with reference to the notification module 210.

In yet another embodiment, the memory 237 stores experience or historical data that includes a plurality of prior content graphs and semantic annotations associated with the plurality of prior content graphs. A content graph (CG) is a representation of input data including a plurality of nodes that are interconnected via one or more edges. The nodes represent objects (for example, a person, a car, and the like) and/or activities (for example, a person smoking, fuel being dispensed from a nozzle, and the like) determined from the input data. The edges represent the relationships between the objects and/or the activities. The prior CGs are generated based on historical data, i.e., input data previously generated by the sensors.

For example, the prior CGs represent videos received in the past five years from a closed-circuit television camera installed at a commercial site. The generation of CGs is described in further detail with reference to the graph module 204. A semantic annotation (SA) is any type of information that provides a machine-readable description (i.e., understandable by a computing device, for example, the semantics engine 130) of the input data. In one embodiment, the SAs include "predicates" based on domain specific ontology. For example, if a video received as input data, displays a car (A) near a person (B), the predicate would be defined as: car(A), person(B), exited(B,A). The SAs associated with the plurality of prior CGs are defined and indexed in the memory 237, for example, by an administrator of the semantic engine 130. As used herein, video refers to one or more image frames of a particular activity or event.

The communication module 202 includes codes and routines for handling communications between the sensors, the network, and the other modules of the semantics engine 130. In one embodiment, the communication module 202 includes a set of instructions executable by the processor 235 to provide the functionality for handling communication between the sensors, the network, and the other modules of the semantics engine 130. In another embodiment, the communication module 202 is stored in the memory 237 and is accessible and executable by the processor 235. In either embodiment, the communication module 202 is adapted for communication and cooperation with the processor 235 and other modules of the semantics application 140 via the bus 220.

In one embodiment, the communication module 202 receives input data from the sensors and sends the input data to the graph module 204. In another embodiment, the communication module 202 receives a notification from the notification module 210. In such an embodiment, the communication module 202 sends the notification to, for example, an administrator of the semantics engine 130.

The graph module 204 includes codes and routines for generating a CG. In one embodiment, the graph module 204 includes a set of instructions executable by the processor 235 to provide the functionality for generating a CG. In another embodiment, the graph module 204 is stored in the memory 237 and is accessible and executable by the processor 235. In either embodiment, the graph module 204 is adapted for communication and cooperation with the processor 235 and other modules of the semantics application 140 via the bus 220.

The graph module 204 receives input data from the plurality of sensors via the communication module 202 and generates CGs representative of the received input data. In one embodiment, the graph module 204 receives a "new video" as input data from a camera installed at a gas station. In such an embodiment, the graph module 204 determines objects (e.g., a car, a person, and the like), activities (e.g., a person smoking, a car driving away from a fuel pump, and the like), and the relationships between the objects and/or activities. The relationships may include a spatial relationship (e.g., the distance between a car and the fuel pump), a temporal relationship (e.g., the time at which the car stopped near the fuel pump), and a dynamic relationship (e.g., the speed at which the car approached the fuel pump). The graph module 204 determines the objects/activities and the relationships by processing the video using computer vision algorithms, for example, object detection using visual cue analysis, object tracking, and the like. The graph module 204 generates a "new CG" representative of the objects/activities and the relationships in the new video, as nodes and edges respectively. The graph module 204 then transmits the new CG to the comparison module 206.

The comparison module 206 includes codes and routines for comparing the new CG with a plurality of prior CGs. In one embodiment, the comparison module 206 includes a set of instructions executable by the processor 235 to provide the functionality for comparing a new CG with a plurality of prior CGs. In another embodiment, the comparison module 206 is stored in the memory 237 and is accessible and executable by the processor 235. In either embodiment, the comparison module 206 is adapted for communication and cooperation with the processor 235 and other modules of the semantics application 140 via the bus 220.

In one example, the comparison module 206 receives the new CG from the graph module 204 and retrieves the experience data (i.e., prior CGs and the SAs associated with each of the prior CGs) from the memory 237. The comparison module 206 compares the new CG with the prior CGs to identify portions of the prior CGs that match portions of the new CG. In one embodiment, the comparison module 206 identifies the matching portions between the new CG and the prior CGs based on sub-graph isomorphism. In such an embodiment, the comparison module 206 generates a mapping between the nodes and the edges of the new CG and each of the prior CGs. For example, the comparison module 206 determines that a node representing a car in the new CG matches with a node representing the car in a prior CG. In a further embodiment, the comparison module 206 also identifies analogously matching portions between the new CG and the prior CGs. For example, the comparison module 206 determines that a node representing a man walking a dog in the new CG analogously matches with a man walking a cat in a prior CG. In another example, the comparison module 206 determines that a node representing a motorcycle in the new CG analogously matches with a node representing an all-terrain vehicle in the prior CG. Once a portion of a prior CG that matches a portion of the new CG is identified, the comparison module 206 nominates one or more SAs associated with the matching portion of the prior CG, as potential SAs for the new CG. The identification of matching prior CGs and the nomination of associated SAs are described below in detail with reference to FIG. 3. The narrative module 208 and the notification module 210 are further discussed in detail below.

Figure 3:
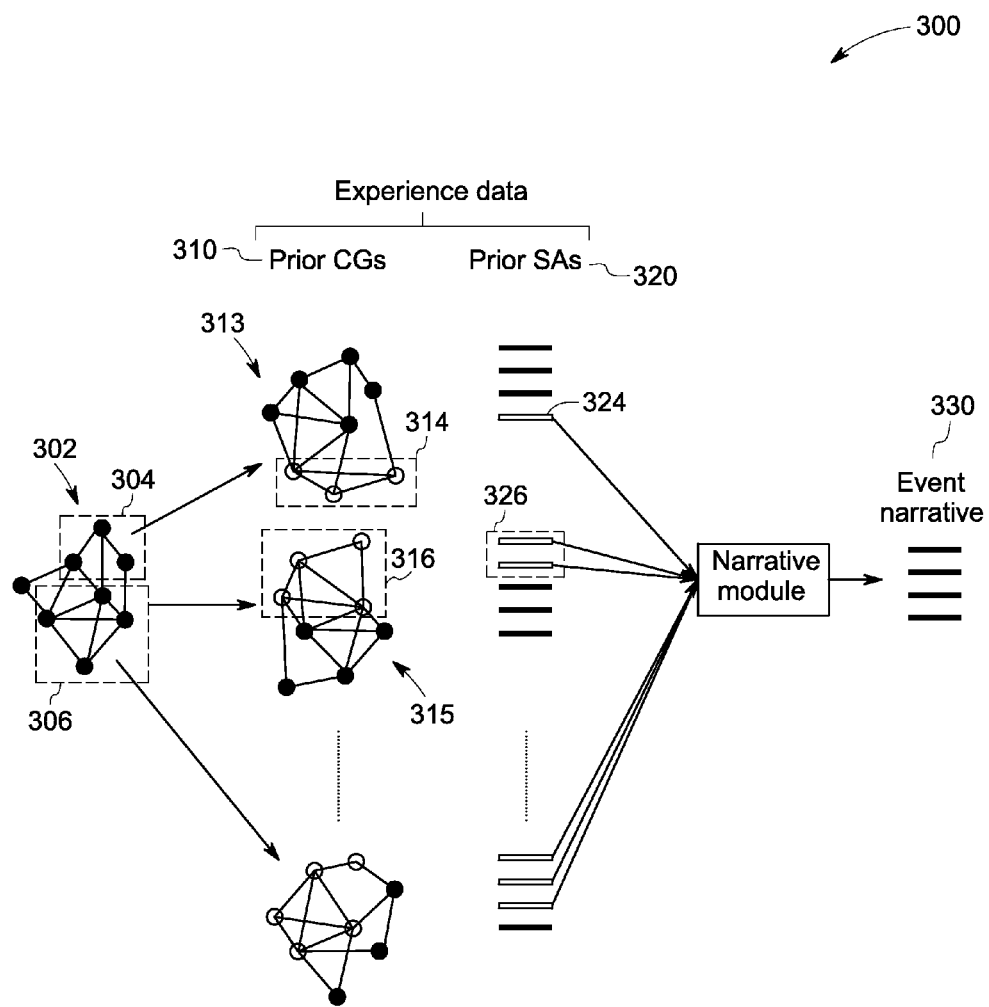
FIG. 3 is a graphical representation illustrating a method for generating semantic annotations according to one embodiment.

FIG. 3 is a graphical representation 300 illustrating a method for generating SAs according to one embodiment. In the illustrated embodiment, the comparison module receives a new CG 302 from the graph module. The comparison module retrieves experienced data including the prior CGs 310 and the associated SAs 320 from memory. The comparison module then generates a mapping between the new CG 302 with each of the prior CGs 310. In the illustrated embodiment, the comparison module identifies a portion 314 of a first prior CG 313 that matches with a first portion 304 of the new CG 302. The comparison module also determines a portion 316 of a second prior CG 315 that matches with a second portion 306 of the new CG 302. Although, in the illustrated embodiment, the comparison module determines matching portions 314, 316 from prior CGs 313, 315 respectively, in other embodiments, the comparison module may determine any number of matching portions from any number of prior CGs. The comparison module further determines strength data that indicates the strength of the determined match. The strength data includes the number of matching nodes and the number of matching edges between the portions of the new CG and the corresponding matching portions of the prior CGs. In the illustrated embodiment, the comparison module determines that there are three matching nodes and two matching edges between the first portion 304 of the new CG 302 and the matching portion 314 of the first prior CG 313. The comparison module then nominates a first and a second set of SAs 324 and 326 associated with the matching portions 314 and 316 respectively, as potential SAs for the new CG 302.

Referring back to FIG. 2, the comparison module 206 sends the nominated SAs to the narrative module 208. In one embodiment, the comparison module 206 also transmits the strength data associated with the nominated SAs to the narrative module 208.

The narrative module 208 includes codes and routines for analyzing the nominated SAs and generating an event narrative. In one embodiment, the narrative module 208 includes a set of instructions executable by the processor 235 to provide the functionality for analyzing the nominated SAs and generating an event narrative 330. In another embodiment, the narrative module 208 is stored in the memory 237 and is accessible and executable by the processor 235. In either embodiment, the narrative module 208 is adapted for communication and cooperation with the processor 235 and other modules of the semantics application 140 via the bus 220.

In one embodiment, the narrative module 208 analyzes the nominated SAs and generates an event narrative 330 (shown in FIG. 3), i.e., a sequence of SAs describing the new video. The narrative module 208 generates the event narrative 330 by selecting SAs from the nominated SAs for each portion of the new CG. The narrative module 208 then combines the selected SAs to generate a sequence of SAs that temporally corresponds with the new video.

In one embodiment, the narrative module 208 selects the SAs for a portion of the new CG by analyzing the strength data corresponding to the nominated SAs. In one example, for a portion of the new CG, the narrative module 208 receives two sets of nominated SAs associated with matching portions of two different prior CGs. The strength data corresponding to the matching portion of a first prior CG indicates that there are three matching nodes and two matching edges. The strength data corresponding to the matching portion of the second prior CG indicates that there are three matching nodes and four matching edges. In such an example, the narrative module 208 selects the set of SAs associated with the matching portion of the second prior CG.

In another embodiment, the narrative module 208 selects the SAs for a portion of the new CG by analyzing the statistical data associated with the nominated SAs. In one example, for a portion of a new CG, the narrative module 208 receives two sets of nominated SAs corresponding to matching portions of two different prior CGs. The statistical data indicates that the occurrence of the first set of SAs in the experience data is higher than the occurrence of the second set of SAs. In such an example, the narrative module 208 generates the event narrative by selecting the first set of SAs for the portion of the new CG.

In one embodiment, the narrative module 208 analyzes whether the selection and combination of the nominated SAs satisfies one or more logical constraints. The one or more logical constraints are defined, for example, by administrator of the semantics engine 130. In one example, the narrative module 208 receives three nominated SAs for a new CG. The first nominated SA is: Person (A), Car (B), fuels (B, A). The second nominated SA is: Person (A), Bicycle (C), rides (C, A). The third nominated SA is: Person (A), Car (B), enters (B, A). In this example, the narrative module 208 generates an event narrative for the new CG, by selecting and combining the first and the third nominated SAs, because the combination satisfies a logical constraint that after a person fuels a car in a gas station, the person would enter the car to drive it.

Once the event narrative for a new CG is generated, the narrative module 208 transmits the event narrative to the notification module 210. In one embodiment, the narrative module 208 further indexes the event narrative and the new CG with the experience data in the memory 237. Such an indexing is advantageous as it would improve the nomination of SAs and generation of event narratives for input data received in the future.

The notification module 210 includes codes and routines for generating a notification and sending the notification to, for example, an administrator of the semantics engine 130. In one embodiment, the notification module 210 includes a set of instructions executable by the processor 235 for generating a notification and sending the notification to, for example, an administrator of the semantics engine 130. In another embodiment, the notification module 210 is stored in the memory 237 and is accessible and executable by the processor 235. In either embodiment, the notification module 210 is adapted for communication and cooperation with the processor 235 and other modules of the semantics application 140 via the bus 220.

In one embodiment, the notification module 210 receives the event narrative for the new video from the narrative module 208. The notification module 210 determines whether the event narrative satisfies one or more notification categories defined by, for example, an administrator of the semantics engine 130. The notification categories include, for example, safety, theft, vandalism, business opportunity, and the like. If the received event narrative satisfies one or more notification categories, the notification module 210 sends a notification to, for example, the administrator of the semantics engine. The notification includes, for example, an e-mail, an alarm, a voice message, a short messaging service (SMS), and the like.

In one example, the notification module 210 receives an event narrative indicating that a customer standing in a supermarket appears to be confused. In such an example, the notification module 210 determines that the event narrative satisfies the business opportunity category and sends a notification to a sales person of the supermarket. In another example, the notification module 210 receives an event narrative indicating that a person is speaking on his mobile phone near a gas pump. In such an example, the notification module 210 determines that the event narrative satisfies the safety category and raises an alarm in the gas station.

Figure 4:
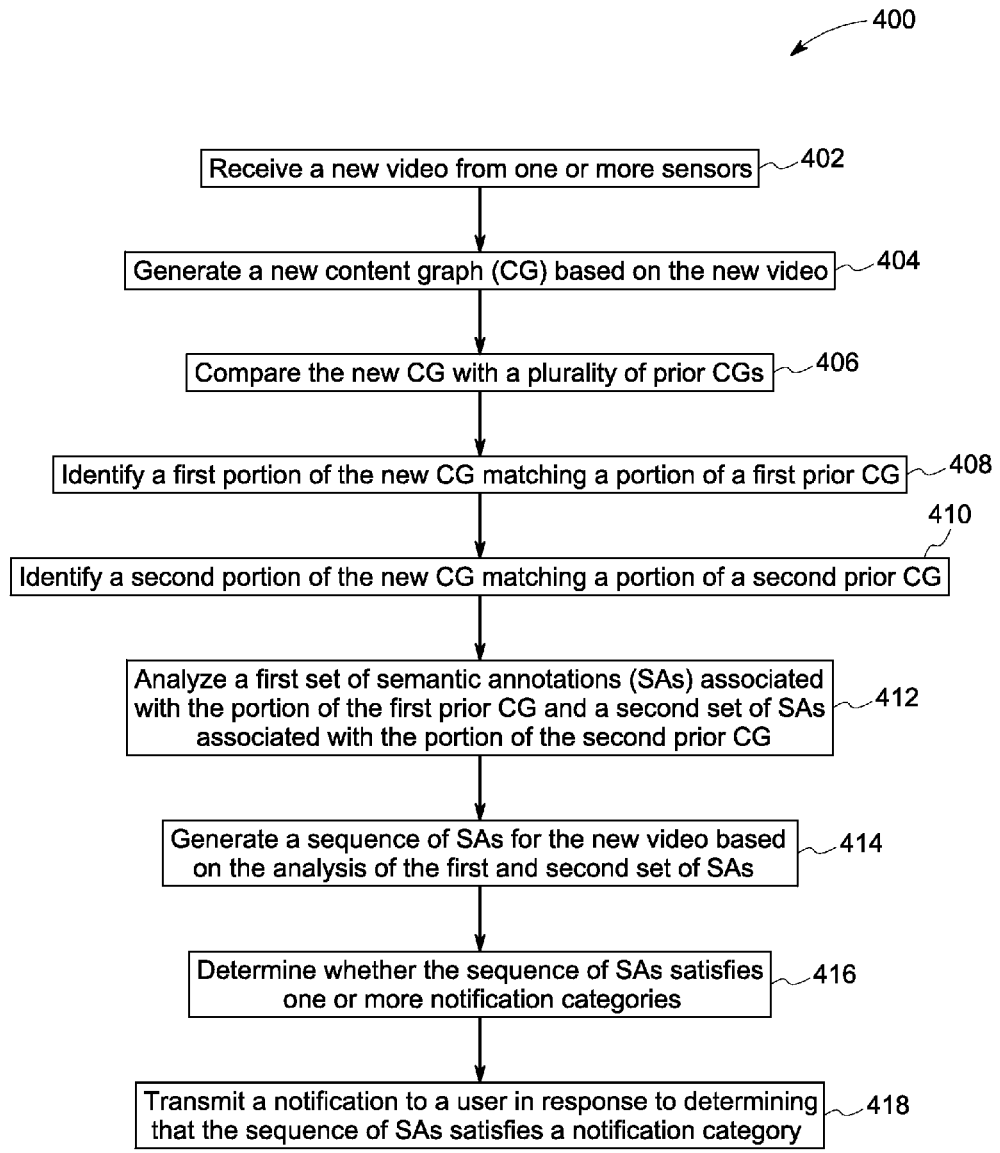
FIG. 4 is a flow diagram illustrating a method for generating semantic annotations according to one embodiment.

FIG. 4 is a flow diagram 400 illustrating an exemplary method for generating an event narrative. The communication module receives a new video from one or more sensors. For example, the communication module receives a video 402 displaying a criminal approaching a driver with the intention of stealing the driver's wallet in a gas station. The graph module generates a new CG based on the new video 404. The comparison module compares the new CG with a plurality of prior CGs 406. The comparison module retrieves the plurality of prior CGs from the experience data stored in the memory. For example, the retrieved experience data includes two prior CGs and SAs associated with the two prior CGs. In this example, the SAs associated with the first prior CG includes:

1a) The driver starts to pump gas.
1b) A person approaches the driver.
1c) The person asks the driver for directions.
1d) The person leaves.
1e) The driver finishes the pumping process.

The SAs associated with the second prior CG includes:

2a) The driver starts to pump gas.
2b) The car catches fire.
2c) The driver runs away from the dangerous situation.

In the above example, for the purpose of simplicity, the SAs are described using natural language descriptors instead of predicates. The comparison module identifies a first portion of the new CG matching a portion of a first prior CG 408. The comparison module also identifies a second portion of the new CG matching a portion of a second prior CG 410. The narrative module analyzes a first set of SAs associated with the portion of the first prior CG and a second set of SAs associated with the portion of the second prior CG 412. The narrative module then generates a sequence of SAs (i.e., event narrative) for the new video based on the analysis of the first and the second set of SAs 414. In the above example, where the new video displays a driver running away from a criminal, the comparison module nominates 1a, 1b, 2a, and 2c as potential SAs. The narrative module analyzes the strength data associated with the nominated SAs and generates an event narrative that includes:

1a, 2a) The driver starts to pump gas.
1b) A person approaches the driver.
2c) The driver runs away from the dangerous situation.

The notification module determines whether the sequence of SAs satisfies one or more notification categories 416. The notification module then transmits a notification to a user (for example, an administrator of the semantics engine) in response to determining that the sequence of SAs satisfies a notification category 418. In the above example, the notification module determines that the sequence of SAs satisfies the safety category and sends a notification. This is advantageous compared to the aforementioned intelligent platforms since the semantics engine generates a sequence of SAs for the new video and determines a critical event (i.e., a dangerous person/criminal is present in the gas station), even though it was not pre-defined prior to receiving the new video.

Although, the CGs and the event narrative are described above in reference to a video input DATA according to one embodiment, in other embodiments, the CGs and the event narrative may be generated based on audio inputs, mechanical inputs, point of sale inputs, and the like. For example, the graph module generates a new CG representing a new audio input DATA using speech recognition algorithms. The comparison module nominates SAs based on the new content graph. The narrative module then generates an event narrative based on the new audio input.

Similar to the detection of a criminal described in reference to FIG. 4, additional examples of critical events that may be detected by the semantics engine are described below:

Static discharge: A customer in a fuel stations starts pumping gas into his vehicle. In order to escape the cold, the customer goes back into his car. The customer then exits the car and then reaches for the gasoline nozzle. However, while in the car the customer may have built up a static charge which may then ignite the gasoline. In such an example, the semantics engine determines that the sequence of SAs satisfies a safety category and sends a real-time alert to, for example, an employee of the gas station to shut down the gasoline dispenser.

Drive-offs: A customer may attempt to drive off without removing the gasoline nozzle out of the car and placing it on the holder.

Smoking: A customer might attempt to smoke inside the fuel station. In the above two examples the semantics engine determines that the sequence of SAs satisfies the safety category and raises an alarm (a siren, an announcement, and the like) instructing the customer to stop driving the car and remove the nozzle, stop smoking, and the like.

Tampering: An individual may attempt to tamper with fuel station machinery. The individual may, for example, insert objects into the gasoline nozzle, open the gasoline dispenser cabinet, park a truck or a large vehicle for a prolonged period of time that shield the visibility of the gasoline dispenser, and the like. The semantics engine determines that the sequence of SAs satisfies a theft/vandalism category and sends an alert to, for example, a security guard to immediately check the gas dispenser.

Distressed or valuable customers: A customer may get distressed due to a malfunctioning gasoline dispenser or confused with the variety of car-wash options presented. In another example, the customer might be identified as a frequent visitor. In such examples, the semantics engine determines that the sequence of SAs satisfies a business opportunity category and alerts an employee, transmits discounts to the gasoline dispenser in the form of digital advertising, and the like.

It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While the invention has been described in detail in connection with only a limited number of embodiments, it should be readily understood that the invention is not limited to such disclosed embodiments. Rather, the system can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims. What is claimed as new and desired to be protected by Letters Patent of the United States is:

The invention claimed is:

1. A method, comprising:
    receiving a new video from one or more sensors;
    generating a new content graph (CG) based on the new video;
    comparing the new CG with a plurality of prior CGs, wherein the plurality of prior CGs are generated from a plurality of previously received videos;
    identifying a first portion of the new CG matching a portion of a first prior CG among the plurality of prior CGs and a second portion of the new CG matching a portion of a second prior CG among the plurality of prior CGs;
    analyzing a first set of semantic annotations (SAs) associated with the portion of the first prior CG and a second set of SAs associated with the portion of the second prior CG; and
    generating a sequence of SAs that temporally corresponds with the new video by combining the first set of SAs and the second set of SAs based on the analysis of the first and the second set of SAs.

2. The method of claim 1, wherein the new CG includes a plurality of nodes interconnected via one or more edges.

3. The method of claim 2, wherein the plurality of nodes represent at least one of a plurality of objects and a plurality of activities in the new video.

4. The method of claim 2, wherein the one or more one or more edges represent at least one of a spatial relationship, a temporal relationship, and a dynamic relationship between the plurality of nodes.

5. The method of claim 2, wherein identifying the portion of the first prior CG further comprises determining at least one of a number of matching nodes and a number of matching edges between the first portion of the new CG and the portion of the first prior CG.

6. The method of claim 1, wherein analyzing the first and the second set of SAs further comprises analyzing statistical data associated with the first and the second set of SAs.

7. The method of claim 1, further comprising:
    determining whether the sequence of SAs satisfies a notification category; and
    sending a notification in response to determining that the sequence of SAs satisfies the notification category.

8. The method of claim 7, wherein the notification category includes at least one of safety, theft, vandalism, and business opportunity.

9. A system, comprising:
    at least one processor;
    a graph module stored in a memory and executable by the at least one processor, the graph module configured for receiving a new video from one or more sensors and generating a new content graph (CG) based on the new video;
    a comparison module stored in the memory and executable by the at least one processor, the comparison module communicatively coupled to the graph module for comparing the new CG with a plurality of prior CGs and identifying a first portion of the new CG matching a portion of a first prior CG among the plurality of prior CGs and a second portion of the new CG matching a portion of a second prior CG among the plurality of prior CGs, wherein the plurality of prior CGs are generated from a plurality of previously received videos; and
    a narrative module stored in the memory and executable by the at least one processor, the narrative module communicatively coupled to the comparison module for analyzing a first set of semantic annotations (SAs) associated with the portion of the first prior CG and a second set of SAs associated with the portion of the second prior CG and generating a sequence of SAs that temporally corresponds with the new video by combining the first set of SAs and the second set of SAs based on the analysis of the first and the second set of SAs.

10. The system of claim 9, wherein the new CG includes a plurality of nodes interconnected via one or more edges.

11. The system of claim 10, wherein the comparison module is further configured to determine at least one of a number of matching nodes and a number of matching edges between the first portion of the new CG and the portion of the first prior CG.

12. The system of claim 9, wherein the narrative module is further configured to analyze statistical data associated with the first and the second set of SAs.

13. The system of claim 9, further comprising a notification module for determining whether the sequence of SAs satisfies a notification category and sending a notification to a user in response to determining that the sequence of SAs satisfies the notification category.

14. A computer program product comprising a non-transitory computer readable medium encoded with instructions that, in response to execution by at least one processor, cause the processor to perform operations comprising:
    receiving a new video from one or more sensors;
    generating a new content graph (CG) based on the new video;
    comparing the new CG with a plurality of prior CGs, wherein the plurality of prior CGs are generated from a plurality of previously received videos;
    identifying a first portion of the new CG matching a portion of a first prior CG among the plurality of prior CGs and a second portion of the new CG matching a portion of a second prior CG among the plurality of prior CGs;
    analyzing a first set of semantic annotations (SAs) associated with the portion of the first prior CG and a second set of SAs associated with the portion of the second prior CG; and
    generating a sequence of SAs that temporally corresponds with the new video by combining the first set of SAs and the second set of SAs based on the analysis of the first and the second set of SAs.

15. The computer program product of claim 14, wherein the new CG includes a plurality of nodes interconnected via one or more edges.

16. The computer program product of claim 15, wherein the plurality of nodes represent at least one of a plurality of objects and a plurality of activities in the new video.

17. The computer program product of claim 15, wherein the one or more one or more edges represent at least one of a spatial relationship, a temporal relationship, and a dynamic relationship between the plurality of nodes.

18. The computer program product of claim 14, further causing the processor to perform operations comprising determining at least one of a number of matching nodes and a number of matching edges between the first portion of the new CG and the portion of the first prior CG.

19. The computer program product of claim 14, further causing the processor to perform operations comprising analyzing statistical data associated with the first and the second set of SAs.

20. The computer program product of claim 14, further causing the processor to perform operations comprising:

determining whether the sequence of SAs satisfies a notification category;

sending a notification to a user in response to determining that the sequence of SAs satisfies the notification category.

* * * * *